United States Patent
Retzbach

(10) Patent No.: US 6,666,461 B1
(45) Date of Patent: Dec. 23, 2003

(54) CLAMPING CHUCK

(75) Inventor: Thomas Retzbach, Bonnigheim (DE)

(73) Assignee: Schunk GmbH & Co. KG Fabrik fur Spann-und Graifwerkzeuge, Lauffen (DE)

( * ) Notice: Subject to any disclaimer, the term of this patent is extended or adjusted under 35 U.S.C. 154(b) by 0 days.

(21) Appl. No.: 10/168,325

(22) PCT Filed: Nov. 9, 2000

(86) PCT No.: PCT/EP00/11060
§ 371 (c)(1),
(2), (4) Date: Jun. 20, 2002

(87) PCT Pub. No.: WO01/45884
PCT Pub. Date: Jun. 28, 2001

(30) Foreign Application Priority Data

Dec. 20, 1999  (DE) .......................................... 199 61 563

(51) Int. Cl.⁷ ............................................. B23B 31/117
(52) U.S. Cl. ...................... 279/9.1; 279/102; 403/280; 403/281; 403/282; 29/520; 409/234
(58) Field of Search ................................ 279/9.1, 46.1, 279/46.2, 87, 96, 102; 403/274, 280–282, 365, 368, 369, 371; 29/516, 517, 520

(56) References Cited

U.S. PATENT DOCUMENTS

| | | | | |
|---|---|---|---|---|
| 3,868,192 A | * | 2/1975 | Pennington et al. ........ | 403/281 |
| 4,799,838 A | | 1/1989 | Kubo .......................... | 409/234 |
| 5,639,176 A | * | 6/1997 | Mullenberg .................. | 403/282 |
| 5,647,685 A | * | 7/1997 | Fukui et al. ................. | 403/371 |
| 5,961,247 A | * | 10/1999 | Gold et al. .................. | 403/369 |
| 6,131,916 A | * | 10/2000 | Toda ........................... | 279/9.1 |

FOREIGN PATENT DOCUMENTS

GB         883 667        12/1961

* cited by examiner

Primary Examiner—Steven C. Bishop
(74) Attorney, Agent, or Firm—Liniak, Berenato & White, LLC

(57) ABSTRACT

A clamping chuck has a chuck body made of a dimensionally stable material, on which is provided a clamping sleeve that forms a central receptacle for a workpiece or tool that is to be clamped, and has a clamping mechanism for immobilizing in the receptacle the component that is to be clamped, while elastically deforming the clamping sleeve. There is configured in the chuck body an annular groove which surrounds the receptacle to form the clamping sleeve and is open toward the end face of the chuck body. The clamping mechanism includes a wedge ring that has a ring body and multiple clamping tongues arranged thereon, spaced apart from one another in the circumferential direction, and projecting substantially axially. The wedge ring possesses a cross section tapering in a wedge shape toward the free end, and it can be pressed axially into the annular groove while radially deforming the clamping sleeve.

7 Claims, 2 Drawing Sheets

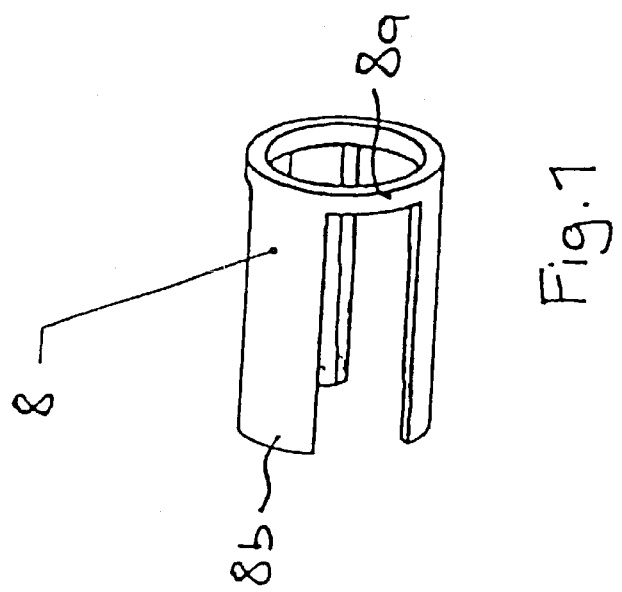
Fig. 1
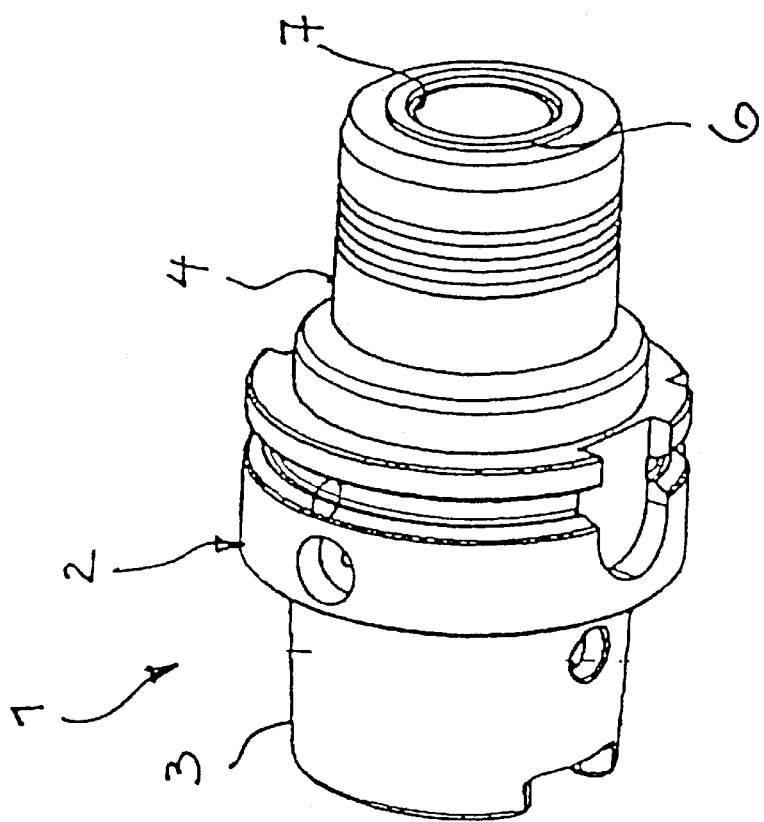

CLAMPING CHUCK

The present invention concerns a clamping chuck having a chuck body made of a dimensionally stable material, on which is provided a clamping sleeve that forms a central receptacle for a workpiece or tool that is to be clamped, and having clamping means for immobilizing in the receptacle the component that is to be clamped, while elastically deforming the clamping sleeve.

A clamping chuck of this kind, which is used e.g. to immobilize a tool shaft (such as a drill or milling cutter shaft) on the working spindle of a corresponding machine tool, is known inter alia from WO 98/32563. It comprises a basic body made of a dimensionally stable material that has at its one end region a mounting taper for chucking into a rotationally driven working spindle of a machine tool. Provided at the other end of the basic body is a thin-walled clamping sleeve that forms a substantially cylindrical receptacle for a component to be clamped, and possesses an outer surface that tapers off conically toward its free end. In the known clamping chuck, immobilization of a component inserted into the receptacle is accomplished by the fact that a shrink ring is pressed onto the clamping sleeve from its free end, thereby deforming the material of the clamping sleeve inward against the component to be clamped. Since the material of the clamping sleeve is crushed with this type of clamping, very high clamping forces are necessary. A further disadvantage is the fact that the arrangement lacks radial rigidity, since the shrink ring, when it is slid onto the clamping sleeve, does not come into contact with the chuck body and thus cannot support the clamping sleeve.

It is therefore the object of the invention to configure a clamping chuck of the kind cited initially in such a way that lower clamping forces are necessary, and in particular so that it also possesses great radial rigidity.

According to the present invention, this object is achieved in that there is configured in the chuck body an annular groove which surrounds the receptacle to form the clamping sleeve and is open toward the end face of the chuck body; and that what is provided as the clamping means is a wedge ring that has a ring body and multiple clamping tongues, arranged thereon spaced apart from one another in the circumferential direction and projecting substantially axially, which possess a cross section tapering off in a wedge shape toward the free end and can be pressed axially into the annular groove while radially deforming the clamping sleeve. According to the present invention, therefore, immobilization of a component in the clamping chuck receptacle is accomplished by the fact that the clamping tongues are pressed into the annular groove. Because the clamping tongues are arranged spaced apart from one another in the circumferential direction, the material of the clamping sleeve is then deformed radially inward only in those areas in which it is in contact with the clamping tongues, while the material of the clamping sleeve in the circumferential regions located between the clamping tongues can also deflect radially outward into the annular groove, so that unlike the case with the known clamping chucks in which full circumference clamping is provided, the material is not crushed. In addition, the clamping tongues pressed into the annular groove are braced externally against the solid chuck body, so that in contrast to the shrink ring of the known arrangement, they do not need to absorb all the clamping forces. The bracing also results in great radial rigidity.

According to a preferred embodiment, the wedge ring, which advantageously can be made of metal and in particular of steel, possesses a total of three clamping tongues that are arranged in uniformly spaced-apart fashion on the ring body.

In order to achieve homogeneous planar contact between the clamping tongues and the clamping sleeve, according to another preferred embodiment provision is made for the inner walls of the clamping tongues to lie on a conical surface diverging toward the free clamping tongue ends, and for the outer wall of the clamping sleeve to be configured in substantially complementary fashion to the inner walls of the clamping tongues, and correspondingly to taper off conically toward the end face of the chuck body. The outer walls of the clamping tongues can lie on a common cylindrical surface.

With regard to further advantageous embodiments of the invention, the reader is referred to the dependent claims and to the description below of an exemplary embodiment with reference to the appended drawings, in which:

FIG. 1 shows an embodiment of a clamping chuck according to the present invention, in a perspective view;

Figure 2:
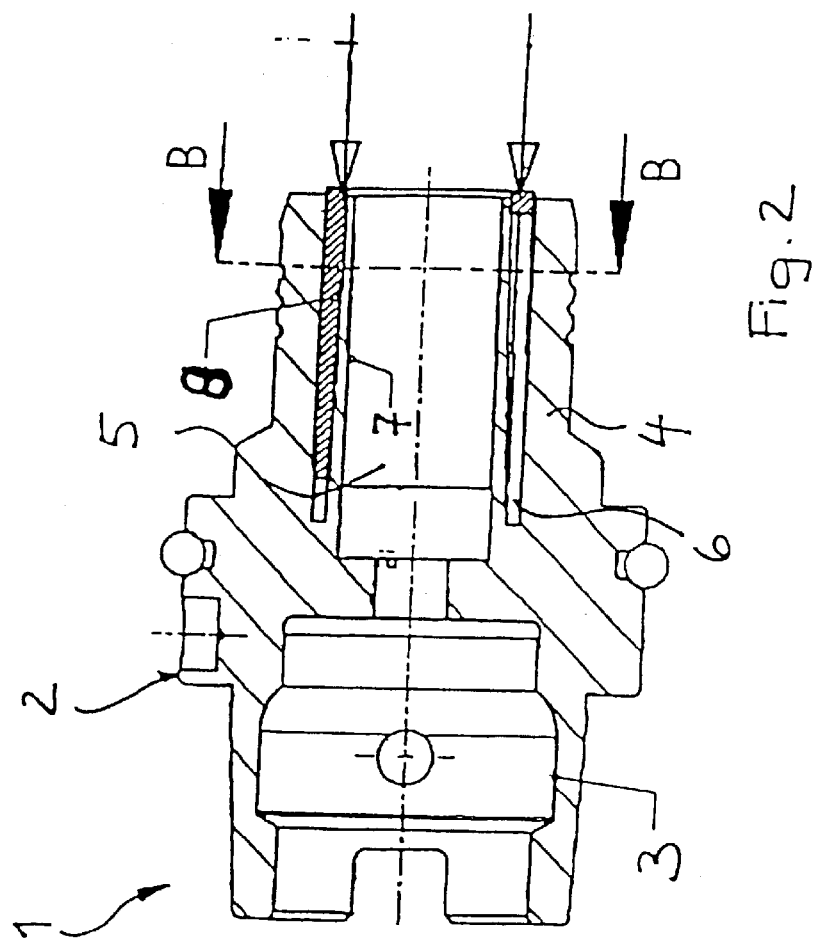
FIG. 2 shows the clamping chuck of FIG. 1 in longitudinal section.
Figure 3:
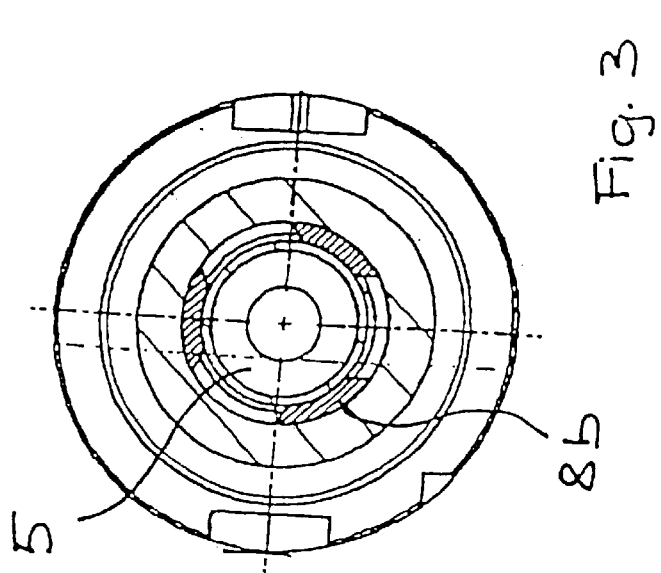
FIG. 3 shows the clamping chuck in section along line B—B in FIG. 2.

The Figures depict an embodiment of a clamping chuck 1 according to the present invention. Clamping chuck 1 comprises a basic body 2 made of a dimensionally stable material, which has at its left end region (in the drawing), in a manner known per se, a mounting taper 3 for clamping into a rotationally driven working spindle of a machine tool. Provided at the other end of basic body 2 is a connector shaft 4 having a central receptacle 5 into which a cylindrical shaft of a tool, for example of a drill or milling cutter, can be inserted. An annular space or annular groove 6, which surrounds receptacle 5 and is oriented coaxially with it, is configured in connector shaft 4. Annular groove 6, whose axial length corresponds approximately to the necessary clamping region, is delimited toward receptacle 5 by a relatively thin inner wall (called clamping sleeve 7), and radially outward by the wall of basic body 2, whose wall thickness is several times greater than the wall thickness of clamping sleeve 7. As is evident in particular in FIG. 2, annular groove 6 possesses an approximately wedge-shaped cross section which is configured such that the outer wall of clamping sleeve 7 tapers off conically toward the free end of connector shaft 4, while the outer wall of annular groove 6 is cylindrical.

A wedge ring 8 that has a ring body 8a and three clamping tongues 8b, which are arranged on ring body 8a spaced apart from one another in the circumferential direction and extend substantially in the axial direction, is provided for immobilization of a tool shaft or the like in receptacle 5. Clamping tongues 8b taper off in a wedge shape toward their free ends; their outer walls lie on a cylindrical surface whose diameter corresponds approximately to the outside diameter of annular groove 6, and the inner walls, corresponding to the outer wall of clamping sleeve 7, lie on a conical surface diverging toward the free clamping tongue ends. Wedge ring 8 can be driven into annular groove 6 from the end face of connector shaft 4, thereby deforming clamping sleeve 7 radially inward in the contact region with clamping tongues 8b and, as a result, immobilizing a tool shaft or the like inserted into receptacle 5. In the circumferential regions located between clamping tongues 8b, the material of clamping sleeve 7 can deflect outward into annular groove 6. When wedge ring 8 is driven into annular groove 6, clamping tongues 8b are braced externally against basic body 2, thereby imparting great radial strength to the arrangement.

A hydraulic mechanism (not depicted) is provided for releasing the connection; with this, the left end (in the drawing) of annular groove 6 can be impinged upon by a hydraulic medium in order to generate in annular groove 6 a pressure that causes basic body 2 to expand slightly so that wedge ring 8 can easily be released from annular groove 6.

What is claimed is:

1. A clamping chuck having a chuck body (2) made of a dimensionally stable material, on which is provided a clamping sleeve (7) that forms a central receptacle (5) for a workpiece or tool that is to be clamped, and having clamping means (8) for immobilizing in the receptacle (5) the component that is to be clamped, while elastically deforming the clamping sleeve (7), wherein there is configured in the chuck body (2) an annular groove (6) which surrounds the receptacle (5) to form the clamping sleeve and is open toward an end face of the chuck body (2); and what is provided as the clamping means is a wedge ring (8) that has a ring body (8*a*) and multiple clamping tongues (8*b*), arranged thereon spaced apart from one another in the circumferential direction and projecting substantially axially, which possess a cross section tapering off in a wedge shape toward the free end and can be pressed axially into the annular groove (6) while radially deforming the clamping sleeve (7).

2. The clamping chuck as defined in claim 1, wherein the wedge ring (8) has a total of three clamping tongues (8*a*) that are arranged in uniformly spaced-apart fashion on the ring body (8*b*).

3. The clamping chuck as defined in claim 1, wherein the outer walls of the clamping tongues (8*b*) lie on a common cylindrical surface.

4. The clamping chuck as defined in claim 1, wherein the inner walls of the clamping tongues (8*b*) lie on a conical surface diverging toward the free clamping tongue ends.

5. The clamping chuck as defined in claim 4, wherein the outer wall of the clamping sleeve (7) is configured in substantially complementary fashion to the inner walls of the clamping tongues (8*b*), and correspondingly tapers off conically toward the end face of the chuck body (2).

6. The clamping chuck as defined in claim 1, wherein the wedge ring (8*a*) is made of metal.

7. The clamping chuck as defined in claim 6, wherein the metal is steel.

* * * * *